United States Patent
Nagai et al.

(10) Patent No.: US 6,795,092 B1
(45) Date of Patent: Sep. 21, 2004

(54) DATA PROCESSING APPARATUS AND METHOD, AND STORAGE MEDIUM

(75) Inventors: Hiroyuki Nagai, Yokohama (JP); Hiroaki Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/503,480

(22) Filed: Feb. 14, 2000

(30) Foreign Application Priority Data

Feb. 15, 1999 (JP) .............................. 11-035611
Jan. 21, 2000 (JP) ....................... 2000-012894

(51) Int. Cl.⁷ ................................................ G09G 5/00
(52) U.S. Cl. ..................... 345/716; 345/719; 345/723; 386/46
(58) Field of Search ................. 707/4, 104.1, 201, 707/203, 3, 102; 709/201; 345/723, 716, 719, 726, 730, 731, 732; 386/46, 52, 83

(56) References Cited

U.S. PATENT DOCUMENTS

| | | | |
|---|---|---|---|
| 5,708,845 A | * | 1/1998 | Wistendahl et al. ..... 707/500.1 |
| 5,782,692 A | * | 7/1998 | Stelovsky ....................... 463/1 |
| 5,907,659 A | * | 5/1999 | Yamauchi et al. ............. 386/95 |
| 5,928,331 A | * | 7/1999 | Bushmitch .................. 709/231 |
| 5,995,936 A | * | 11/1999 | Brais et al. .................. 704/275 |
| 6,154,601 A | * | 11/2000 | Yaegashi et al. .............. 386/52 |
| 6,195,497 B1 | * | 2/2001 | Nagasaka et al. ............. 386/46 |
| 6,266,053 B1 | * | 7/2001 | French et al. ............... 345/302 |
| 6,332,144 B1 | * | 12/2001 | DeVries et al. ............. 707/102 |
| 6,449,608 B1 | * | 9/2002 | Morita et al. ................... 707/3 |
| 6,463,444 B1 | * | 10/2002 | Jain et al. ................. 707/104.1 |

FOREIGN PATENT DOCUMENTS

JP          8009310          1/1996

OTHER PUBLICATIONS

Hardman, Ossenbruggen, Mullender, Rutledge, and Bulteman, "Do You Have the Time? Composition and Linking in Time–based Hypermedia", ACM, 1999, pp. 189–196.*

* cited by examiner

Primary Examiner—John Breene
Assistant Examiner—Cheryl Lewis
(74) Attorney, Agent, or Firm—Fitzpatrick, Cella, Harper & Scinto (57) ABSTRACT

A conventional partial data reproduction method proposed can be applied to a document constituted of a single media data type, but cannot be applied to a document constituted of plural types of media data including still image data, text image data and the like and reproduction control information for the media data. To solve this problem, the apparatus has an input unit for inputting plural types of media data and their reproduction control information and a scene reproduction control information preparing unit for preparing scene reproduction control information for reproducing a scene, which is reproduction control information for at least one of a plurality of scenes dividing a reproduction time depending on the reproduction control information, by controlling the plural types of media data so as to correlate the scene reproduction control information with the digest data.

38 Claims, 9 Drawing Sheets

MEDIA DATA

TEXT DATA | MOVING IMAGE DATA | STILL IMAGE DATA | AUDIO DATA

AREA s IS (0, 0, 100, 100)
AREA t IS (100, 100, 200, 100)
AREA u IS (0, 100, 200, 200)
. . . . .
. . . . .

TEXT DATA a IS REPRODUCED FROM TIME 0 TILL TIME 2. DRAWING AREA IS u

MOVING IMAGE DATA a IS REPRODUCED FROM TIME 0 TILL TIME 7. DRAWING AREA IS s

AUDIO DATA a IS REPRODUCED FROM TIME 2 TILL TIME 4

STILL IMAGE DATA a IS REPRODUCED FROM TIME 4 TILL TIME 7. DRAWING AREA IS t

STILL IMAGE DATA b IS REPRODUCED SIMULTANEOUS WITH START OF REPRODUCING AUDIO DATA a TILL TIME 4. DRAWING AREA IS t

. . . . .
. . . . .

REPRODUCTION CONTROL INFORMATION

| SCENE | TIME 0-2 | TIME 2-4 | TIME 4-6 | TIME 6-7 |
|---|---|---|---|---|
| IMPORTANCE | 2 | 3 | 3 | 2 |

| SCENE | TIME 0-2 | TIME 2-4 | TIME 4-6 | TIME 6-7 |
|---|---|---|---|---|
| $D_{PLAY\_START}$ | 2 | 1 | 0 | |
| $D_{PLAY\_END}$ | 1 | 1 | 1 | |
| $N_{ALL\_DATA}$ | 4 | 4 | 3 | |
| $D_{SCENE}$ | 0.75 | 0.5 | 0.33 | |

FIG. 10

DIGEST DATA OF EACH SCENE

SCENE 1
SCENE 2
SCENE 3

SELECT AND REPRODUCE

SMIL DATA FOR SCENE SELECTION

SMIL DATA FOR SCENE REPRODUCTION

*FIG. 11*

```
AREA t  (100, 100, 200, 100)
AREA u  (0, 100, 200, 200)

MOVING IMAGE DATA a IS REPRODUCED FROM NEW TIME 0
(CORRESPONDS TO ORIGINAL TIME 4) TILL NEW TIME 3
(CORRESPONDS TO ORIGINAL TIME 7). DRAWING AREA IS u

AUDIO DATA a IS REPRODUCED FROM NEW TIME 0
(CORRESPONDS TO ORIGINAL TIME 4) TILL NEW TIME 2
(CORRESPONDS TO ORIGINAL TIME 6)

STILL IMAGE DATA a IS REPRODUCED FROM NEW TIME 0
(CORRESPONDS TO ORIGINAL TIME 4) TILL NEW TIME 3
(CORRESPONDS TO ORIGINAL TIME 7). DRAWING AREA IS t
```

DATA PROCESSING APPARATUS AND METHOD, AND STORAGE MEDIUM

BACKGROUND OF THE INVENTION

1. Field of the Invention

The present invention relates to a data processing apparatus and method, and to a storage medium, and more particularly to a method and apparatus for processing contents usable by an apparatus which can synchronously reproduce a plurality of media data, and to a storage medium.

2. Related Background Art

Dynamic contents using moving images and sounds are practically used nowadays because of improvements on computer processing speeds. In order to access information contained in such contents, all the information may be reproduced. However, this approach is not practical when only the digest of the contents is necessary. It is effective for generating a digest by picking up important information from the contents to present the digest to a user. Various methods of generating a digest from moving images have been proposed, for example, in Japanese Patent Application Laid-Open No. 8-009310.

With wide spread of the Internet, there is a need for high speed transmission of dynamic contents. The contents including only moving images and audio data require a transmission of a large amount of data. A unit is under practical use which can generate dynamic contents by combining media data sets having a relatively small data transfer amount such as texts and still images.

Generating a digest of such dynamic contents made of a combination of a plurality of media data sets is also effective.

Already proposed digest generating methods can generate a digest of contents made of a single type of media data. However, they cannot generate a digest of contents made of a plurality of media data sets including still images and texts in addition to moving images and sounds.

If a portion of a document constituted of a plurality of media data sets including still images and texts in addition to moving images and sounds and its reproduction control information, is to be reproduced, it is necessary to perform a fast feed to the portion to be reproduced. A user feels inconvenient to use the apparatus.

SUMMARY OF THE INVENTION

It is an object of the invention to solve all or at least one of the above-described problems.

It is another object of the present invention to process contents made of a plurality of media data sets and generate, for example, a digest of the contents.

Under these objects of the invention, a preferred embodiment discloses a data processing apparatus comprising: an inputting unit for inputting a plurality of media data and data describing time relation among the media data; an inter-media data time analyzing unit for analyzing the time relation among the media data; a scene selecting unit for selecting a representative scene on the basis of a result obtained by the inter-media data time analyzing unit; a media data extracting unit for extracting information including the representative scene from each media data; and a multimedia data restructuring unit for restructuring the extracted information.

It is another object of the invention to provide the data processing apparatus capable of generating a digest of even the contents whose media data change their reproduction contents during the reproduction.

Under such an object of the invention, a preferred embodiment discloses the data processing apparatus which includes an intra-media data time analyzing unit for analyzing contents of each media data in accordance with a type of the media data.

It is another object of the invention to provide the data processing apparatus capable of generating a digest of even the contents whose media data contain video data and sound data changing their reproduction contents.

Under such an object of the invention, a preferred embodiment discloses the data processing apparatus which includes a unit for detecting a change point of video data or audio data.

It is another object of the present invention to make it easy to select a scene to be reproduced, from digests of dynamic contents.

Under such an object of the invention, a preferred embodiment discloses the data processing apparatus in which the multimedia data restructuring unit outputs data of an HTML format.

It is another object of the present invention to provide the data processing apparatus capable of generating a digest of contents using SMIL.

It is another object of the present invention to provide the data processing apparatus in which a scene to be selected is determined from information obtained from each media data.

Under such objects of the invention, a preferred embodiment discloses the data processing apparatus wherein the scene selecting unit includes an importance degree calculating unit for calculating an importance degree of each media data, an importance degree calculating unit responsive to the importance degree of each media data for calculating an importance degree of a whole scene, and a selecting unit for selecting a scene having a higher importance degree.

Another object of the invention is to provide a data processing apparatus which uses a document constituted of a plurality type of media data and reproduction control information defining the reproduction time relation of the media data, and can reproduce each scene.

Under such an object of the invention, a preferred embodiment discloses the data processing apparatus comprising: an inputting unit for inputting plural types of media data and reproduction control information defining a reproduction time relation among the media data; and preparing unit for preparing scene reproduction control information for reproducing a scene selected from information relating to the plural types of media data, differently from the reproduction control information input to the inputting means.

Another object of the invention is to provide the data processing apparatus capable of judging necessary scenes from digest data even if a digest screen is not set.

Under such an object of the invention, a preferred embodiment discloses the data processing apparatus which includes a digest data preparing unit for preparing digest data of a plurality of scenes from the plural types of media data input to the inputting means.

Another object of the invention is to provide the data processing apparatus capable of reproducing a scene at the same time when the digest data is selected.

Under such an object of the invention, a preferred embodiment discloses the data processing apparatus in which correlates the scene reproduction control information with the digest data of the scene.

Another object of the invention is to provide the data processing apparatus capable of properly dividing an input document into a plurality of scenes.

Under such an object of the invention, a preferred embodiment discloses the data processing apparatus which includes a unit for analyzing the time relation among the media data.

Another object of the invention is to provide the data processing apparatus capable of easily selecting a scene desired by a user.

Under such an object of the invention, a preferred embodiment discloses the data processing apparatus which includes a scene selection data preparing unit for generating data for providing digest data of each scene.

Another object of the invention is to provide the data processing apparatus capable of generating a document from which a scene can be selected and reproduced, from a document whose reproduction media data type changes or whose reproduction contents of media sets change.

Under such an object of the invention, a preferred embodiment discloses the data processing apparatus which includes an intra-media time analyzing unit for analyzing the contents of a scene for each type of the media data.

Another object of the invention is to provide the data processing apparatus capable of utilizing for scene division the timing when the reproduction media data changes, which timing is likely to change the data contents greatly.

Under such an object of the invention, a preferred embodiment discloses the data processing apparatus in which the intra-media time analyzing unit includes a unit for detecting a timing when the type of the media data of each scene changes.

Another object of the invention is to provide the data processing apparatus capable of facilitating to reproduce scenes synchronously with a plurality of media data.

Under such an object of the invention, a preferred embodiment discloses the data processing apparatus in which the scene reproduction control information generating unit and a scene selection data generating unit output data of an SMIL format.

Another object of the invention is to provide the data processing apparatus capable of providing a digest of a scene having a high variation degree.

Under such an object of the invention, a preferred embodiment discloses the data processing apparatus in which the scene dividing unit calculates the variation degree of the media data of each scene and divides the reproduction time into scenes in accordance with the variation degree.

Another object of the invention is to provide the data processing apparatus capable of providing various scene division method, such as integrating scenes having a low variation degree not suitable for digests.

Under such an object of the invention, a preferred embodiment discloses the data processing apparatus in which divided scenes are integrated in accordance with the variation degree.

The other objects and advantages of the invention will become apparent from the description of the following embodiments when read in conjunction with the accompanying drawings.

DETAILED DESCRIPTION OF THE PREFERRED EMBODIMENTS

First Embodiment

In this embodiment, SMIL (Synchronized Multimedia Integration Language) is used for describing the time relation of a plurality of media data sets, and HTML (Hyper Text Markup Language) is used for describing a digest. SMIL and HTML are in conformity with Recommendations of W3C (World Wide Web Consortium), and their specifications are available at http://WWW.W3C.org/TR/REC-smil and http://WWW.W3C.org/TR/REC-html 401.

SMIL data indicates a plurality of data (sets) including a media data location, a reproduction timing and a reproduction screen area. HTML data indicates a text digest and links to digest image data of moving images and still images.

In the first embodiment, a digest of contents constituted of SMIL data and a plurality of media data sets (media data) is generated. The digest is constituted of image data and HTML files.

Figure 1:
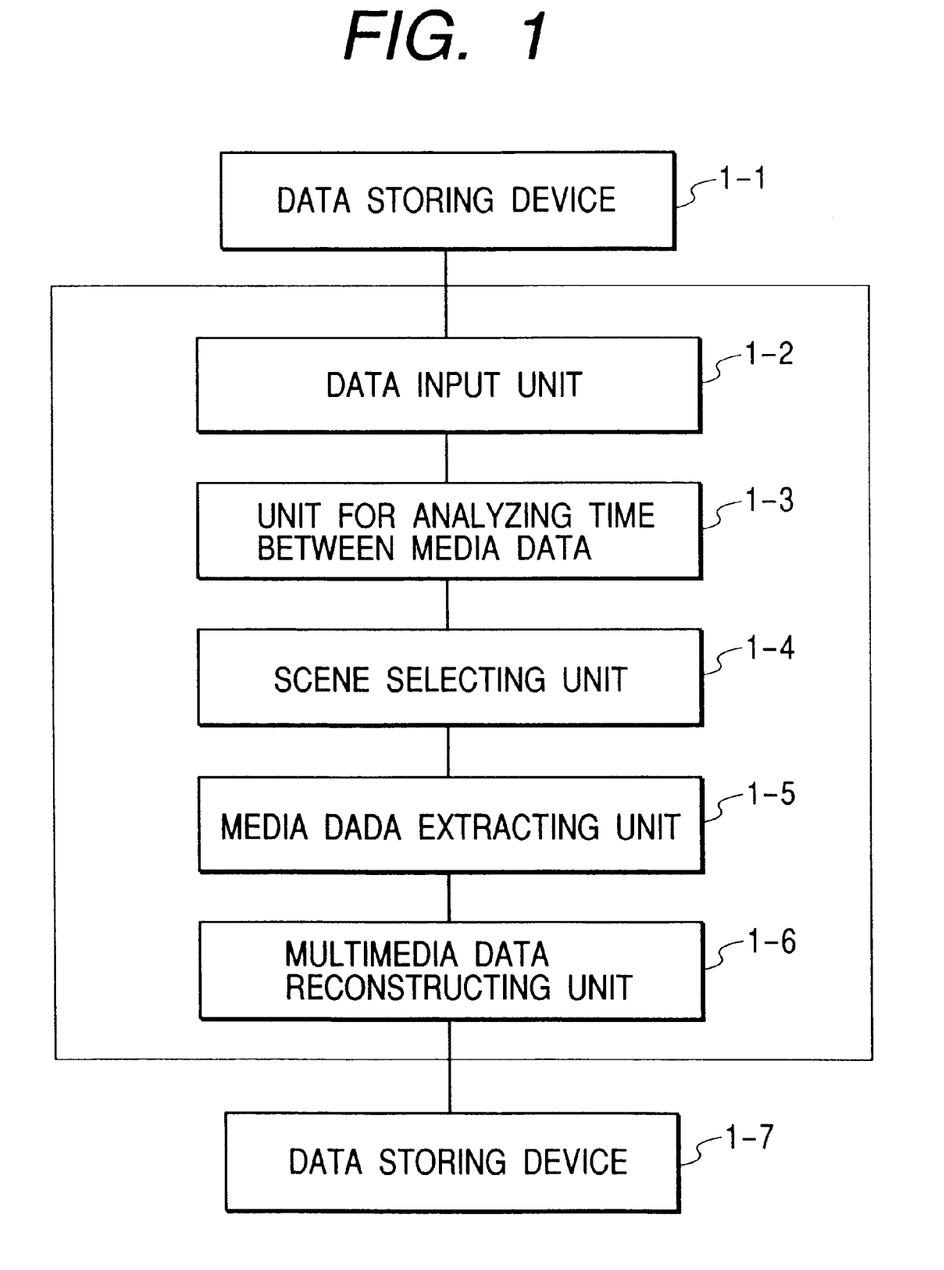
FIG. 1 is a diagram showing the outline structure of a digest generating apparatus according to an embodiment of the invention.

FIG. 1 is a diagram showing the outline structure of a digest generating apparatus according to the embodiment of the invention.

Referring to FIG. 1, reference numeral 1–1 represents a data storing device storing contents to be input, the contents including a plurality of media data sets and SMIL data as their reproduction timing data. Reference numeral 1–2 represents a data input unit for reading the contents data from the data storing device 1–1. Reference numeral 103 represents a unit for analyzing times of media data sets. Reference numeral 1–4 represents a scene selecting unit for dividing a contents reproduction time into scenes in accordance with the analysis results and selecting representative scenes. Reference numeral 1–5 represents a media data extracting unit for extracting information constituting the representative scene from each media data set. Reference numeral 1–6 represents a multimedia data reconstructing unit for reconstructing the extracted data as a digest. Reference numeral 1–7 represents a data storing device for storing the reconstructed digest.

Figure 2:
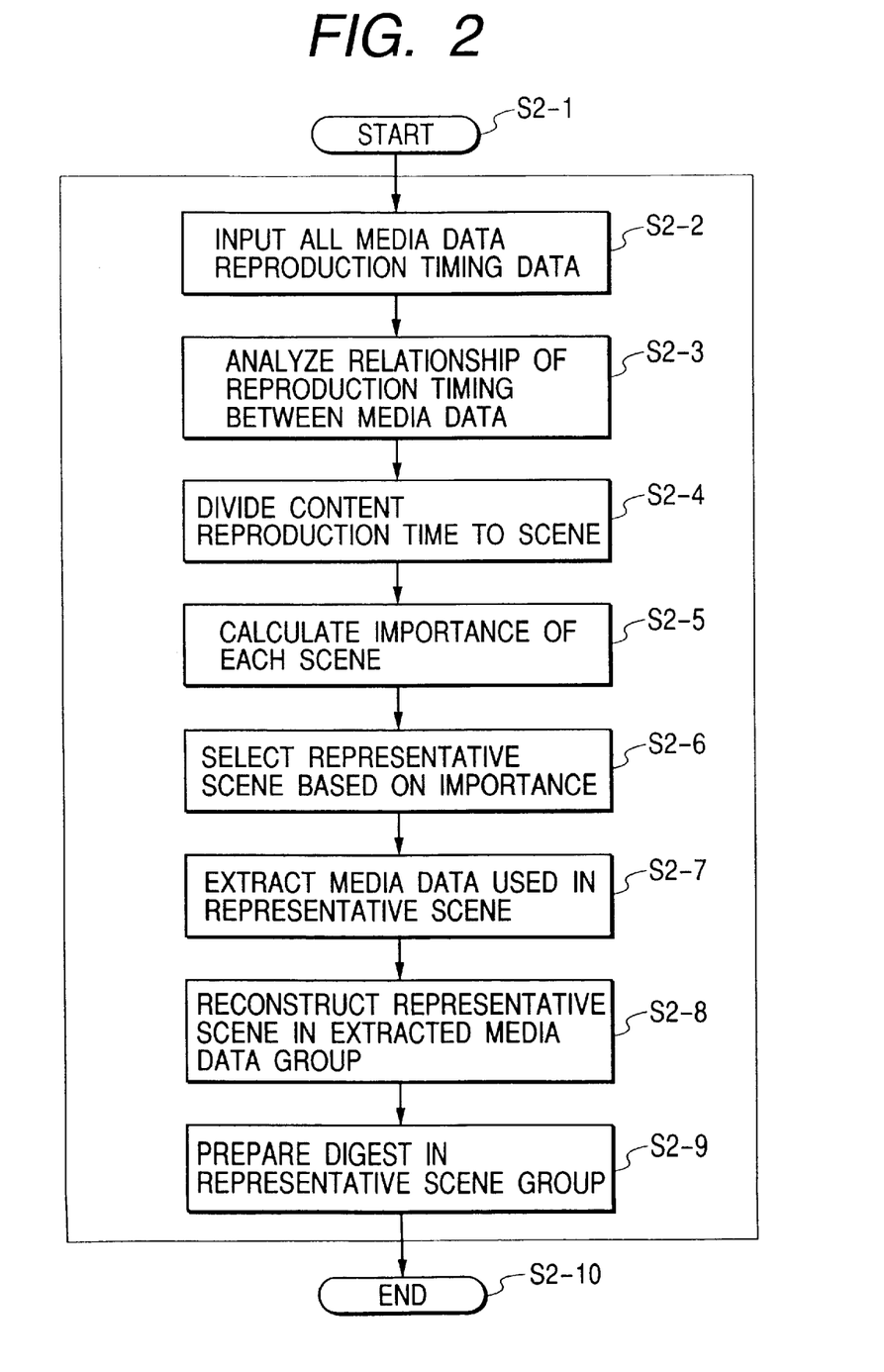
FIG. 2 is a flow chart illustrating a digest generating method.

FIG. 2 is a flow chart illustrating the operation of the apparatus constructed as described with FIG. 1, i.e., a digest generating method.

Referring to FIG. 2, the process starts at a step S2-1. A data inputting step S2-2 reads from the storing device a plurality of media data sets and reproduction timing data representative of a reproduction timing of each media set and its reproduction location. An inter-media data time analyzing step S2-3 analyzes the relation of reproduction time of each media data set. A scene dividing step S2-4 divides the contents reproduction time into scenes in accordance with the analysis results. A scene importance calculating step S2-5 calculates an importance degree of each scene from the importance degree of each media data set used by each scene. A scene selecting step S2-6 selects a scene to be used for the digest in accordance with the scene importance degree. A scene data extracting step S2-7 extracts the media data set constituting a selected representative scene from the media data set used by the scene. A representative scene restructuring step S2-8 restructures a representative scene by using the extracted media data group. A digest generating step S2-9 generates digest data from a representative scene group. At a step S2-10, the process is terminated.

Figure 3:
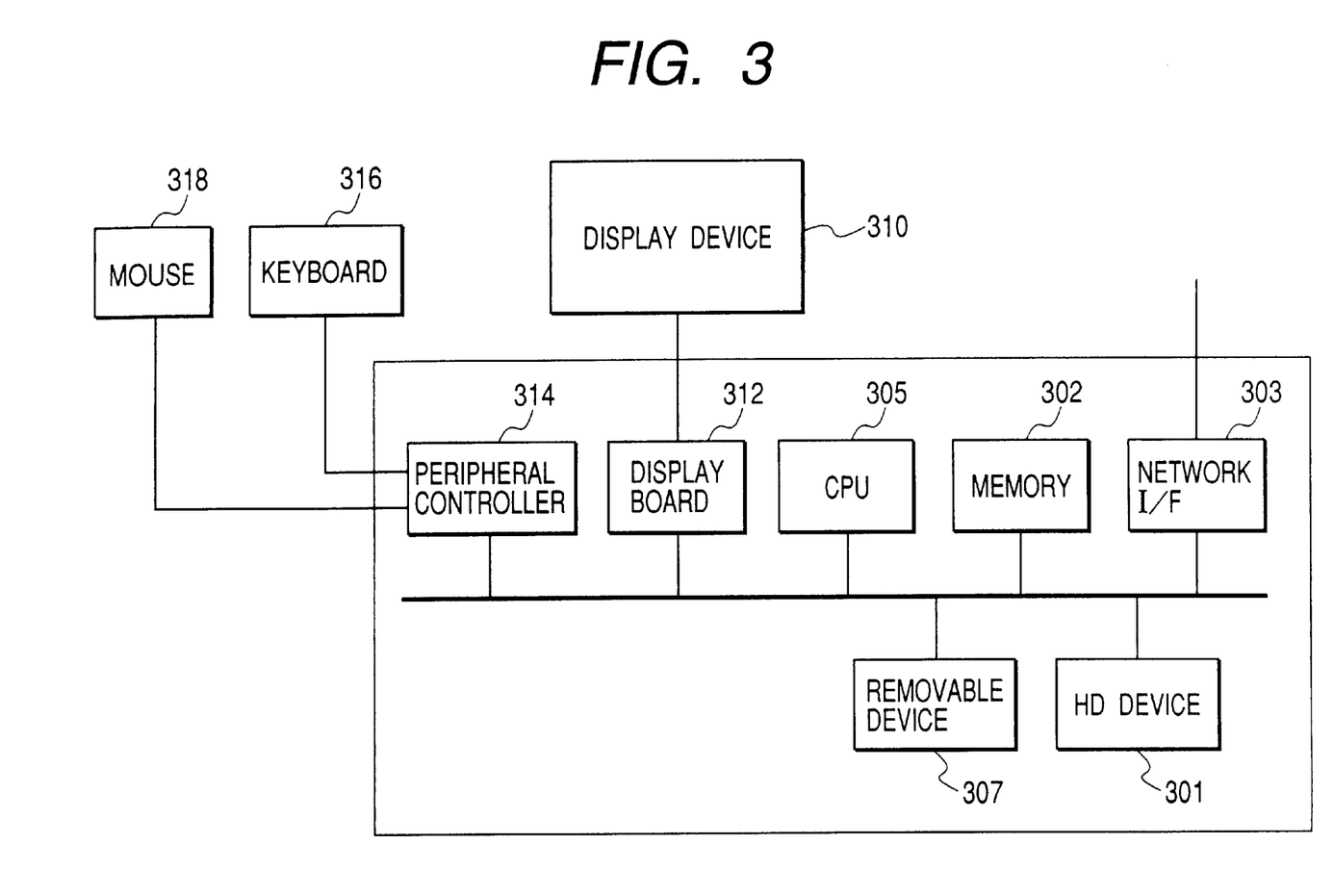
FIG. 3 is a diagram showing the structure of an apparatus according to an embodiment of the invention.

The structure of the apparatus of the embodiment using a computer is shown in FIG. 3.

The apparatus shown in FIG. 3 includes: an HD device 301 and a memory 302 storing programs; a network I/F 303 for connection to a network; a CPU 305 for executing various processes by using programs; a removable device 307 for loading programs and a plurality of media data sets from media; a display device 310; a display board 312, a peripheral controller 314; a keyboard 316; and a mouse 318.

First, SMIL data stored in the HD device or removable device 307 is read. This corresponds to the data inputting step S2-2 shown in FIG. 2.

Figure 4:
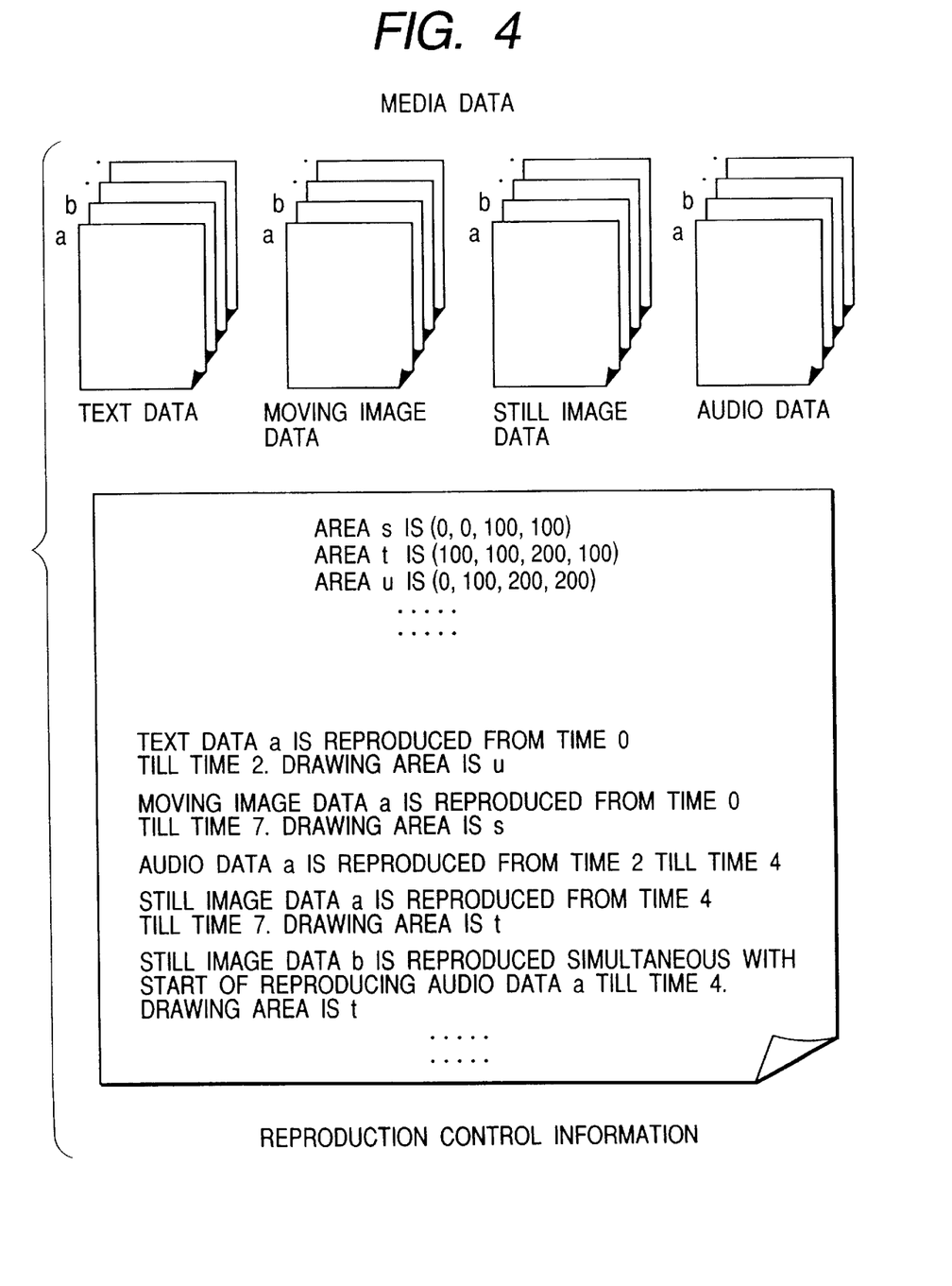
FIG. 4 shows the data structure of a multimedia document and examples of reproduction control information.

FIG. 4 shows examples of a plurality of media data sets and their reproduction control information as reproduction timing data.

A document reproducing apparatus analyzes the reproduction timing data and reproduces each media data set at the corresponding timing to reproduce the document constituted of a plurality of media data sets. In order to make it easy to understand, the reproduction control information is assumed as having been converted into japanese language expression from SMIL. The reproduction start and end times of each media data set are obtained from the reproduction timing data.

Figure 5:
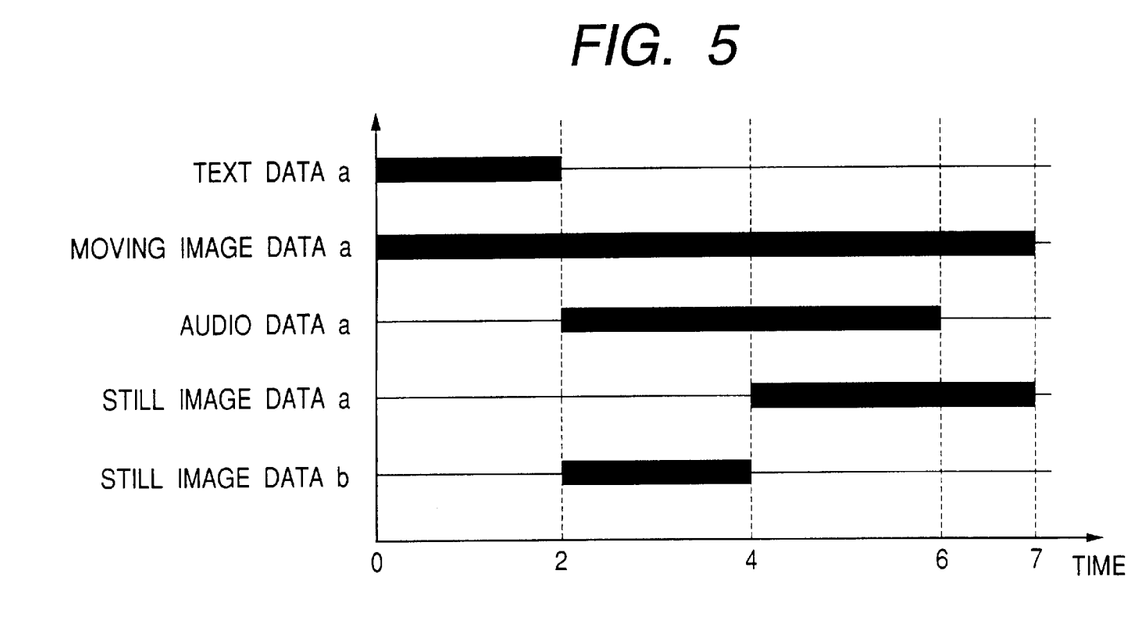
FIG. 5 is a timing chart showing the reproduction timing of each media data set.

FIG. 5 shows the reproduction timing of each media set represented by the reproduction control information shown in FIG. 4. In FIG. 5, the ordinate represents the type of each media data set, and the abscissa represents time. Bold lines in FIG. 5 indicate the reproduction time of each media data set. In this embodiment, at the step S2-3 shown in FIG. 2, the reproduction start and end times of each media data set are arranged in the order of earlier contents reproduction start time. This corresponds to the time on the time axis shown in FIG. 5. These processes are performed by the inter-media data time relation analyzing step S2-3.

Next, by using the obtained time train as scene change timings, the reproduction time is divided into scenes in accordance with the type of a media data set to be reproduced and the contents change timing. More specifically, in this example, the time to a timing 7 shown in FIG. 5 is divided into four scenes between timings 0–2, 2–4, 4–6 and 6–7. This process corresponds to the scene dividing step S2-4.

Next, the importance degree of each scene is calculated, the importance degree being used as an index for selecting a scene to be used for a digest. The importance degree of each divided scene is calculated from the importance degree of each media data set used for reproducing the scene. In this embodiment, it is calculated as a sum of importance degrees of respective media by using the following equation:

$$Si = \Sigma j \, sj \, Si$$

where Si is the importance degree of a scene i, and sj is an importance degree of the media j to be reproduced for the scene i.

The importance degree of each media data set may be predefined as an importance degree of each media data set in accordance with the type of media, may be defined in media synchronization data, may be obtained from additional information in each media data set, or may be a simple weighing factor of each media data set. In summary, any index may be used so long as it can indicate the importance degree of each media data set. If the importance degree is obtained from the additional information in the media data set, it may be considered that the size of a display area of data such as still image data, moving image data and text data is proportional to the importance degree, and that the sound volume of audio data is proportional to the importance degree.

In this embodiment, to make it easy to understand, the weighing factor of each media data set is 1. Namely, the total number of media data sets in each scene is the importance degree of the scene. In the example shown in FIG. 5, the importance degree of each scene calculated takes a value shown in FIG. 6. This corresponds to the scene importance degree calculating step S2-5.

In accordance with the importance degree of each scene obtained in the above manner, the scenes having higher importance degrees are picked up to generate a digest of the contents.

Figure 6:
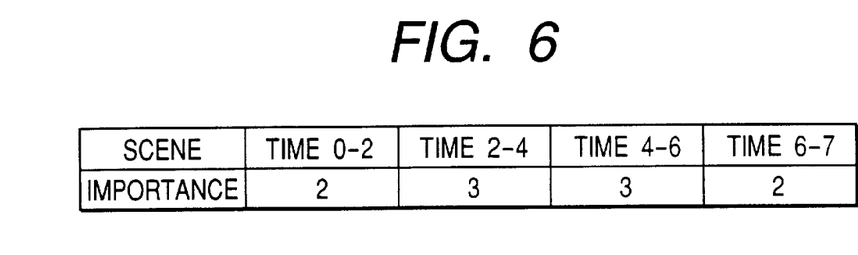
FIG. 6 is a list showing the importance degree of each scene.

In the example, shown in FIG. 6, since the two scenes during the timings 2–4 and 4–6 have the higher importance degrees, these two scenes are selected to generate the digest.

In order to generate a static digest, the representative time is determined from the selected scenes, and the media data set to be produced at that time is obtained. In this embodiment, an HTML file is used as the digest, and audio data is not used for the digest. If a scene contains moving image data, the scene representative time is determined from the moving image data by using a digest generating method such as proposed by Japanese Patent Application Laid-Open No. 8-009310. If a scene does not contain moving image data, the contents of the scene to be reproduced are the same at any timing (since each scene is divided by a reproduction timing of each media data set, the scene reproduction start and end are not included in the scene, and the same contents in the scene are reproduced for the data such as text data and still image data). Therefore, the scene representative time may be set to any timing. In this embodiment, the scene representative time is used as the scene start time. In the example shown in FIG. 5, both of the selected two scenes between timings 2–4 and 4–6 contain moving image data. Therefore, the representative time of each scene is determined by the moving image digest generating method. For example, it is assumed that timings 3 and 5 are determined as the scene representative times. This operation corresponds to the representative scene selecting step S2-6.

After the scene representative time is determined, at step S2-7 a digest to be reproduced at that time is generated. As described above, in this embodiment, the digest is generated as HTML. Therefore, if the scene contains moving image data, the image to be reproduced at the scene representative time is obtained as still image data which is used as scene representative image data. The still image data to used as the scene representative image data is read from a file which is used at the scene representative time. The file can be accessed by forming a link to the address of the file of the scene representative image data in an HTML file to be output as the digest. The contents of text data are written in the HTML file to be output. In this example, the scene representative image for the scene between timings 2–4 is reproduced at the scene representative timing 3. In this case, image data obtained from the moving image data a and the still image data b are used. The scene representative image for the scene between timings 4–6 is reproduced at the scene representative timing 5. In this case, image data obtained from the moving image data a and the still image data a are used. These operations correspond to the representative scene restructuring step S2-8 and digest generating step S2-9.

The HTML file and scene representative image data generated in the above manner can be used as the digest of the contents constituted of the input SMIL file and a plurality of input media data sets.

In this embodiment, although the HTML file and SMIL file are used, the invention is not limited thereto, but other file formats may also be used.

As described so far, according to the embodiment, the data processing apparatus comprises: the inputting unit for inputting a plurality of media data and data describing time relation among the media data; the inter-media data time analyzing unit for analyzing a time relation among the media data; the scene selecting unit for selecting a representative scene on the basis of a result obtained by the analyzing unit; the media data extracting unit for extracting information constituting the representative scene from each media data; and the multimedia data restructuring unit for restructuring the extracted information. Accordingly, a digest of even the contents constituted of a plurality of media data can be generated.

The apparatus is provided with the intra-media data time analyzing unit for analyzing contents of each media data in accordance with a type of the media data. Accordingly, it is possible to generate a digest of even the contents whose media data sets contain video data and sound data changing their reproduction contents.

The intra-media data time analyzing unit includes the unit for detecting a change point of video data or audio (sound) data. Accordingly, it is possible to generate a digest of even the contents of media data containing the video or sound data whose reproduction contents change.

The multimedia data restructuring unit outputs data of the HTML format. It is therefore possible to obtain a static HTML contents from dynamic contents.

The inputting means inputs data of the SMIL format. It is therefore possible to generate a digest of SMIL contents.

The scene selecting unit includes importance degree calculating unit for calculating an importance degree of each media data, importance degree calculating unit responsive to the importance degree of each media data for calculating an importance degree of a whole scene, and selecting unit for selecting a scene having a higher importance degree. Accordingly, a scene to be selected can be determined from information obtained from each media data.

The data processing method comprises: an inputting step of inputting a plurality of media data sets and data describing a data set time relation; an inter-media data time analyzing step of analyzing a time relation of the media data sets; a scene selecting step of selecting a representative scene in accordance with analysis results; a media data extracting step of extracting information constituting the representative scene from each media data set; and a multimedia data restructuring means step of for restructuring the extracted information. Accordingly, a digest of even the contents constituted of a plurality of media data sets can be generated.

The method is provided with at least one intra-media data time analyzing means for analyzing contents of each media data set in accordance with a type of the media data set. Accordingly, it is possible to generate a digest of even the contents whose media data sets contain video data and sound data changing their reproduction contents.

The intra-media data time analyzing step includes a step of detecting a change point of video data or audio data. Accordingly, it is possible to generate a digest of even the contents of media data sets containing the video or sound data whose reproduction contents change.

The multimedia data restructuring step outputs data of the HTML format. It is therefore possible to obtain a static HTML contents from dynamic contents.

The inputting step inputs data of the SMIL format. It is therefore possible to generate a digest of SMIL contents.

The scene selecting step includes an importance degree calculating step of calculating an importance degree of each media data set, an importance degree calculating step responsive to the importance degree of each media data set for calculating an importance degree of a whole scene, and a selecting step of selecting a scene having a higher importance degree. Accordingly, a scene to be selected can be determined from information obtained from each media data set.

A digest of even the contents constituted of a plurality of media data sets can be generated.

Second Embodiment

In this embodiment, SMIL data necessary for selecting and reproducing necessary scenes is generated from a document constituted of SMIL data and a plurality of media data sets. The structure of the apparatus is similar to that shown in FIG. 3, and so the description thereof is omitted.

Figure 7:
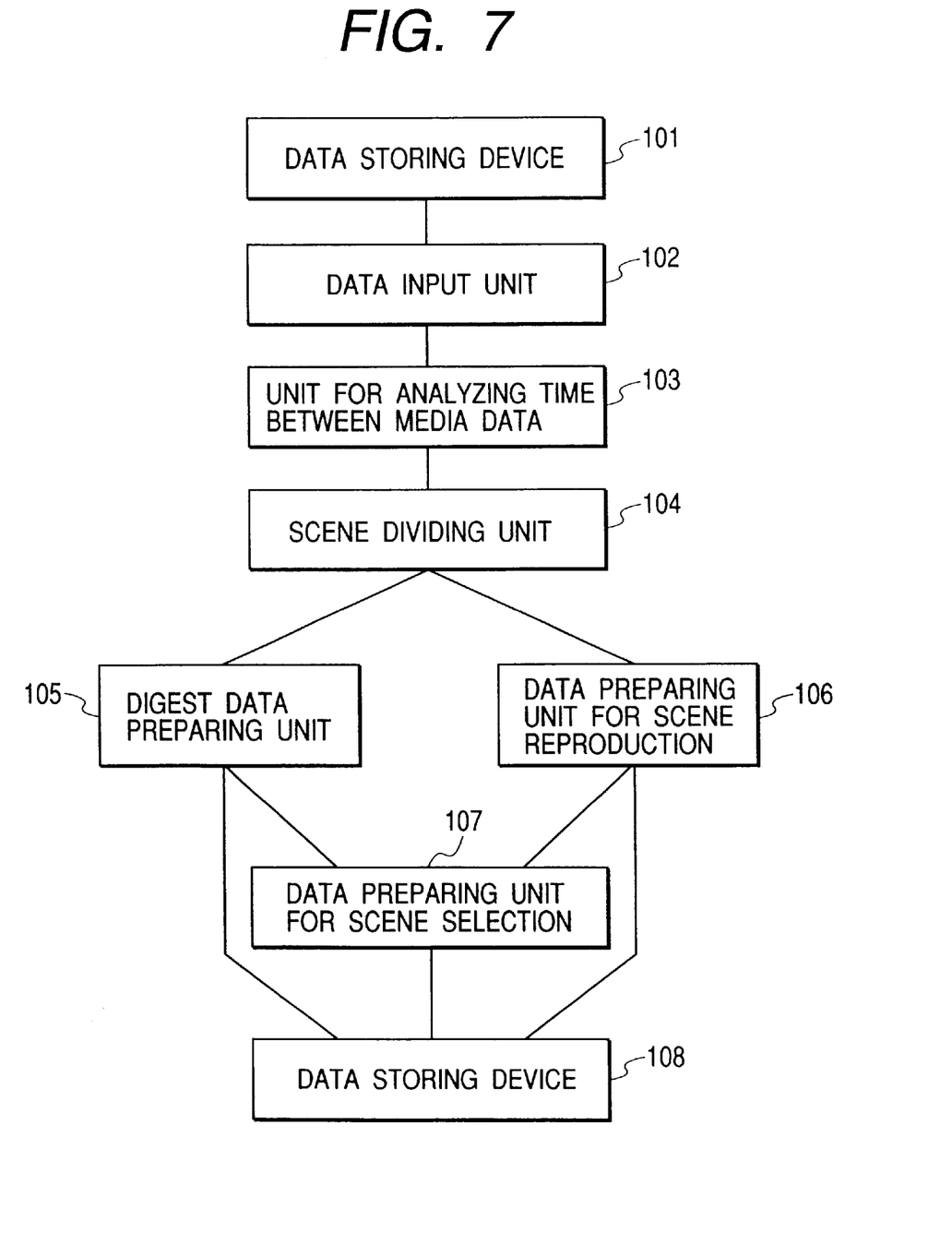
FIG. 7 is a schematic diagram showing the structure of an apparatus for generating a scene selection/reproduction document according to another embodiment.

FIG. 7 shows the outline structure of a data processing apparatus which generates a scene selection/reproduction document.

Reference numeral 101 represents a data storing device for storing SMIL data including a plurality of media data sets and reproduction control information for defining reproduction timings or the like of the media data sets. Reference numeral 102 represents a data inputting unit for reading a document from the data storing device. Reference numeral 103 represents an inter-media time analyzing unit for analyzing the time relation between media data sets. Reference numeral 104 represents a scene dividing unit for dividing a reproduction time of the original document into scenes in accordance with the scene analysis results. Reference numeral 105 represents a digest data preparing unit for preparing digest data in accordance with each media data set constituting a scene. Reference numeral 106 represents a scene reproduction data preparing unit for preparing SMIL data which reproduces each divided scene. Reference numeral 107 represents a scene selection data preparing unit for providing digest data of each scene and preparing data for selecting a reproduction scene. An obtained document is stored in a data storing device 108.

Figure 8:
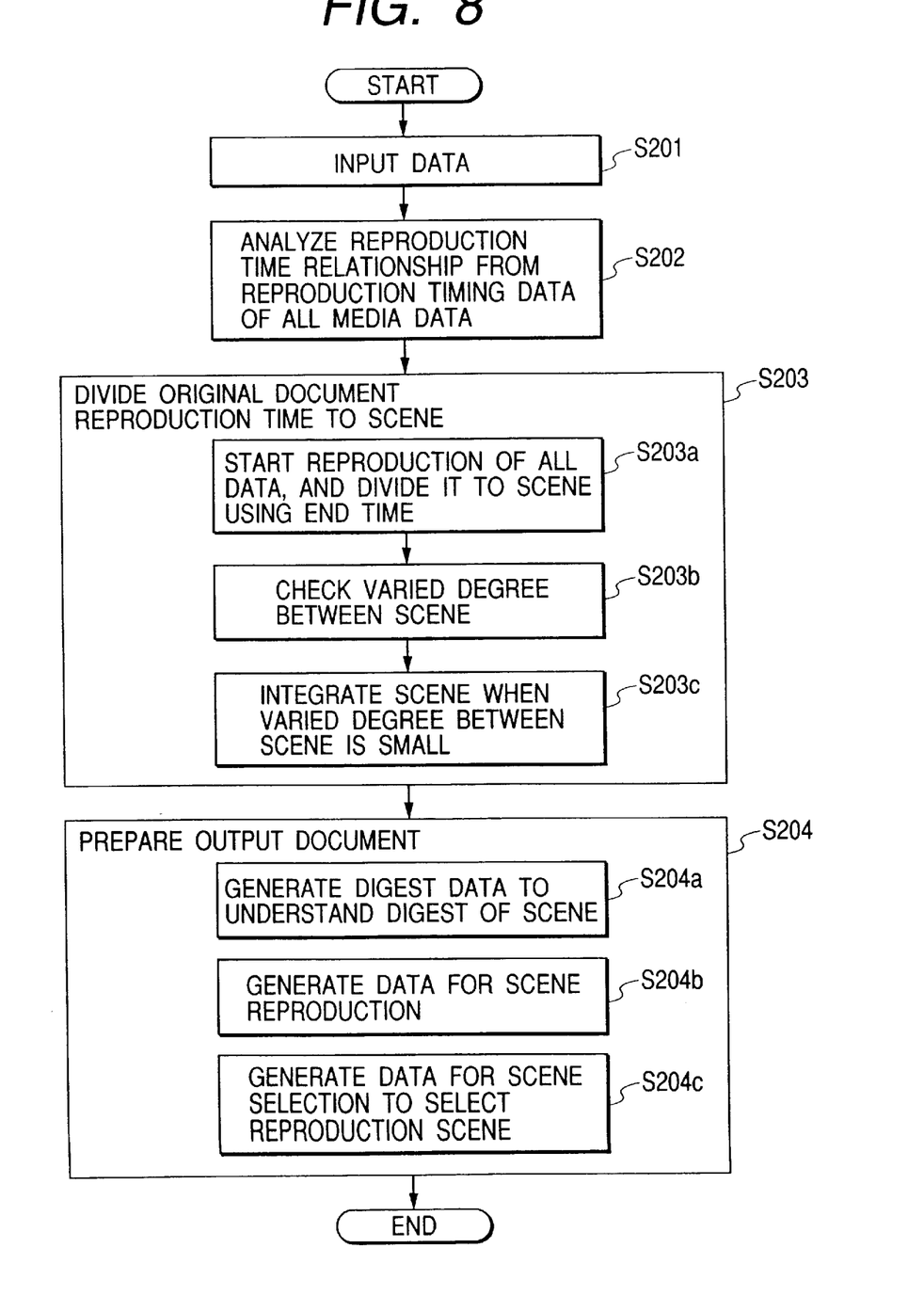
FIG. 8 is a flow chart illustrating a method of generating a scene selection/reproduction document.

FIG. 8 is a flow chart illustrating a method of generating a scene selection/reproduction document.

A step S201 is executed by the data inputting unit 102 to supplies the apparatus with a plurality of media data sets as documents and SMIL data as their reproduction timing data. A step S202 is executed by the inter-media data time analyzing unit 103 to analyze the reproduction time relation of all media data sets in accordance with the SMIL data. A step S203 is executed by the scene dividing unit 104 to divide the reproduction time of the original document into scenes. This step S203 includes three steps S203a, S203b and S203c. The step S203a is an initial scene dividing step which uses reproduction start and end timings of all media data sets. The step S203b is a step of calculating a variation degree of reproduction contents between the scenes divided by the initial scene dividing step, the variation occurring when a scene is changed. The step S203c is a step of integrating scenes whose reproduction contents have a small variation degree. A Step S204 is a step of generating an output document and includes three steps S204a, S204b and S204c. The step S204a is executed by the digest data preparing unit 105 to generate digest data to be used for grasping the outline of a scene. The step S204b is executed by the scene reproduction data preparing unit 106 to generate SMIL data capable of reproducing a scene. The step S204c is executed by the scene selection data preparing unit 107 to generate scene selection data capable of selecting a reproduction scene, by using the relation between the digest data and scene reproduction control information.

The details of the method of generating the scene selection/reproduction document will be given with reference to FIGS. 4, 5, 9 and 10.

First, SMIL data stored in the HD device or removable device is read. This correspond to the data inputting step.

FIG. 4 shows examples of a plurality of media data sets and their reproduction control information.

The document reproducing apparatus analyzes the reproduction timing data and reproduces each media data set at the corresponding timing to reproduce the document constituted of a plurality of media data sets. In order to make it easy to understand, the reproduction control information is assumed as having been converted into japanese language expression from SMIL. The reproduction start and end times of each media data set are obtained from the reproduction timing data.

FIG. 5 shows the reproduction timing of each media set of the document shown in FIG. 4.

In FIG. 5, the ordinate represents the type of each media data set, and the abscissa represents time. Bold lines in FIG. 5 indicate the reproduction time of each media data set. In this embodiment, the reproduction start and end times of each media data set are arranged in the order of earlier reproduction time. This corresponds to the time on the time axis shown in FIG. 5. These processes are performed by the media data time relation analyzing step.

Next, by using, as scene change timings, the time when the type, number and contents of reproduction media data sets to be reproduced change, the reproduction time of the original document is divided into scenes. In this example, the time to the timing 7 shown in FIG. 5 is divided into four scenes between timings 0–2, 2–4, 4–6 and 6–7. This process corresponds to the initial scene dividing step. In this process, even if scenes have a small variation degree, these scenes are divided. Therefore, if similar scenes occur consecutively, these scenes are integrated to prevent scenes from being divided excessively. For example, if the type or number of media data sets to be reproduced changes between scenes, the contents of scenes change greatly in many cases. Therefore, a change in the number of media data sets when the reproduction of one scene stops and the reproduction of the next consecutive scene starts, is used as the integration criterion. The scene variation degree is defined as:

$$D_{scene} = (D_{play\_start} + D_{play\_end})/N_{all\_media}$$

where $D_{scene}$ represents a scene variation degree, $D_{play\_start}$ represents the number of media data sets which start being reproduced upon a scene change, $D_{play\_end}$ represents the number of media data sets which stop being reproduced upon a scene change, and $N_{allmedia}$ represents the total number of media data sets used by the two consecutive scenes. This scene variation degree is 0 if the media data sets used by the two connective scenes do not change, and 1 if all the media data sets are exchanged. The scene variation degree is calculated for all adjacent scenes. This process corresponds to the scene variation degree calculating step.

Figure 9:
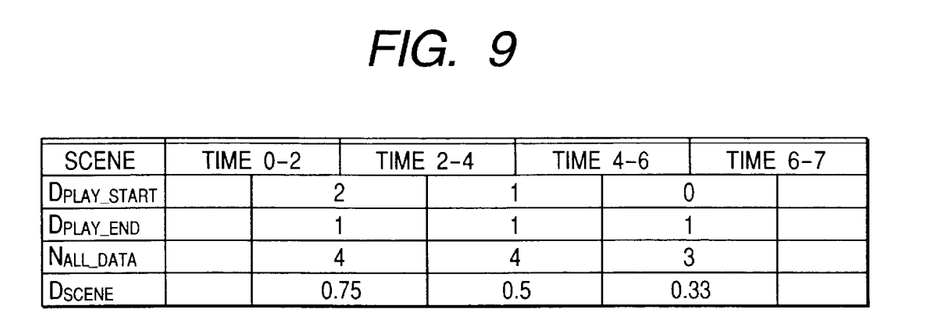
FIG. 9 is a diagram showing examples of a variation degree of each scene.

FIG. 9 shows an example of calculated scene variation degrees of the document shown in FIG. 4.

Next, scenes are integrated if the scene variation degree is small which means that the scene contents change less. This process corresponds to the scene integrating step. The obtained scenes can be selected by a user. If the threshold value of $D_{scene}$ is set to 0.4, the scene during the timings 4–6 and 6–7 are integrated. In this manner, the scene division control can be changed in various ways.

Next, digest data is generated which is used as an index for selecting the scene to be reproduced. The digest data is used as a snap shot at some timing in the scene. If the snap shot contains information as much as possible, the outline of the scene can be more efficiently grasped. Therefore, the snap shot at the time when the scene uses the largest number of media data sets is used. The snap shot image file is generated by checking the media data sets displayed at the determined time and using the drawing area information described in the original SMIL file. These operations correspond to the digest data generating step.

Next, new reproduction control information for reproducing the scene is generated. The SMIL data is generated independently for each scene as a multimedia document using SMIL. By using the media data sets in the scene and new SMIL data having their reproduction timing information, synchronous reproduction is possible even if the scene is only a part of all the scenes.

Media data sets used by the original document are used as they are. Since the new SMIL data is referred to, it is not necessary to perform fast feed to the area to be reproduced. It is not necessary to read original SMIL data. The new SMIL data can save data read time and memory capacity because the new SMIL data is smaller than the original SMIL data.

The SMIL data is necessary to be generated newly. For this new SMIL data, it is necessary to use the drawing area information of the media data sets to be output to the display device and the reproduction start and end information of each media data set.

The drawing area information written in the original SMIL file can be used as it is.

As the reproduction start and end information of each media data set, the information obtained by the media data time relation analyzing step and scene dividing step is used. The inter-media data time analyzing step obtains the reproduction start and end times of all media data sets, as relative times to the reproduction start time of the original document. The scene start and end times obtained at the scene dividing step are also relative times to the reproduction start time of each media data set. By using such reproduction start and end times, the scene reproduction SMIL data is restructured. The scene reproduction document can reproduce only the divided scenes of the original document. These operations correspond to the scene reproduction control information generating step.

Figure 11:
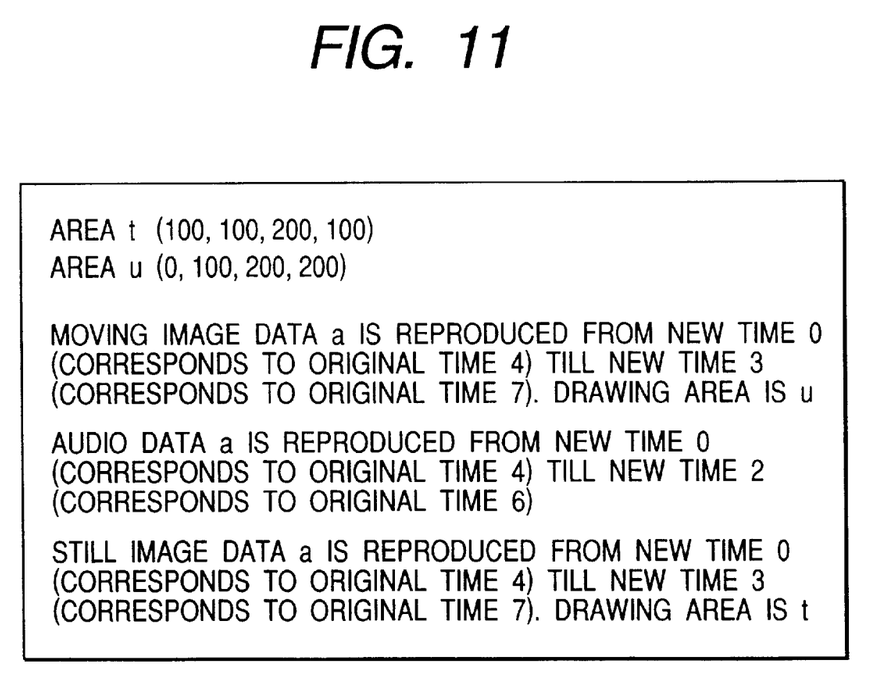
FIG. 11 is a diagram showing an example of scene reproduction control information.

FIG. 11 shows an example of the scene reproduction control information of SMIL data for the reproduction control of the scenes between the timings 4 to 7 shown in FIG. 5.

Lastly, data for selecting a scene to be reproduced is generated. With this data, snap shots for all scenes obtained at the digest data preparing step are displayed and a link to the scene reproduction control information is formed so as to reproduce the scene upon selection of the snap shop. This operation corresponds to the scene selection data preparing step.

Figure 10:
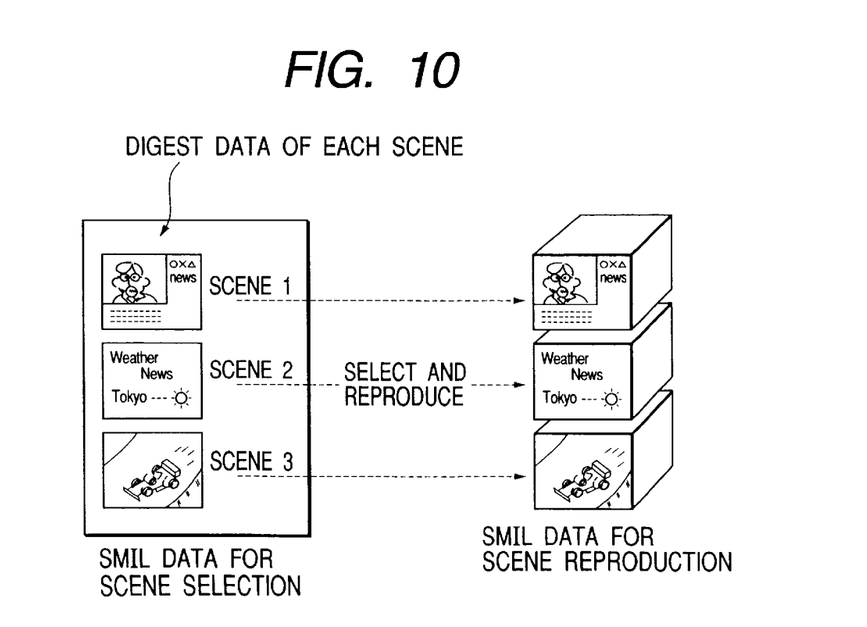
FIG. 10 is a diagram showing the data structure of an output document.

A document output by the above steps is such as that shown in FIG. 10.

In FIG. 10, a news program is used by way of example. A scene a shows a news caster reading news and uses media data sets such as moving image data, audio data, and text data. A scene b shows a weather news and uses text data and BGM music data. A scene c is a sport news scene and uses moving image data and audio data.

In this example, the scenes a, b and c use different media data sets so that they can be recognized as scene changes. Since the digest data is generated, a scene selection is easy.

Since scene reproduction SMIL is generated, each scene can be reproduced upon selection of the scene.

In the above embodiments, SMIL is used as the format of the reproduction control information of input/output documents. The other formats may be used for the reproduction control information.

In the above embodiment, although a snap shot at some time is used as the digest data, the invention is not limited thereto. For example, a combination of snap shots at many timings may be used or audio and text data may be used as the digest data.

In the above embodiments, although scene division is performed based upon the reproduction control information, a link mechanism of SMIL may also be used. In this case, index information representative of a scene change is added to the SMIL file of the original document, and the scene selection data is used as a link to the index. In this case, the scene reproduction data can be set to a single entity.

In the above embodiments, although different data is used for the scene selection data and scene reproduction control data, the invention is not limited thereto. The link mechanism of SMIL has a definition of a link to its inner file. Therefore, the two types of data may be configured in one file.

In the above embodiments, although the components of the apparatus is realized on one computer, the invention is not limited thereto. The components may be realized on computers and processing devices distributed on a network.

In the above embodiments, although programs are stored in ROM, the invention is not limited thereto but any other storage media may be used or a circuit realizing similar operations may be used.

The invention may be applied to a system constituted of a plurality of apparatus or to a single apparatus. It is obvious that the object of the invention can be achieved by supplying a system or apparatus with a storage medium storing software program codes realizing the functions of each embodiment described above, and by reading and executing the program codes stored in the storage medium by a computer (CPU or MPU) of the system and apparatus. In such a case, the program codes themselves read from the storage medium realize the functions of each embodiment. Therefore, the storage medium storing such program codes constitutes the present invention. The storage medium for storing such program codes may be a floppy disk, a hard disk, an optical disk, a magnetooptical disk, a CD-ROM, a CD-R, a magnetic tape, a nonvolatile memory card, a ROM or the like.

It is obvious that the scope of the invention also contains not only the case wherein the functions of each embodiment can be realized by executing the program codes read by a computer, but also the case wherein the functions of each embodiment can be realized by executing a portion or the whole of processes by an OS running on the computer, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

As described so far, according to the present invention, even for a document constituted of a plurality type of media data sets and reproduction control information, each scene can be reproduced.

The digest data generating means is provided for generating digest data of a plurality of scenes in accordance with the plurality type of media data sets input from the inputting means. Accordingly, for example, necessary scenes can be judged from digest data even if a digest screen is not set.

Since a reference of the scene reproduction control information is set to the digest data of the scene, a scene can be reproduced at the same time when the digest data is selected.

Since the time relation of the media data sets is analyzed, it is possible to divide an input document into a plurality of scenes.

The selection data generating means is provided for generating data for providing digest data of each scene. Accordingly, a scene desired by a user can be selected easily.

Since the scene dividing means includes the intra-media time analyzing means for analyzing the contents of a scene for each type of the media data, it is possible to generate a document from which a scene can be selected and reproduced, from a document whose reproduction contents of media data sets change.

Since the intra-media time analyzing means includes means for detecting a timing when the type of the media data set of each scene changes, it is possible to utilize for scene division the timing when the reproduction media data set changes, which timing is likely to change the data contents greatly. The digest can therefore be generated effectively.

The scene reproduction control information generating means and scene selection data generating means output data of the SMIL format. Therefore, it is easy to facilitate the reproduction of scenes synchronously with a plurality of media data sets. The output results can be reproduced from a player matching the SMIL format.

The scene dividing means calculates the variation degree of the media data sets of each scene and divides the reproduction time into scenes in accordance with the variation degree. It is therefore possible to provide a digest of a scene having a high variation degree.

Divided scenes are integrated in accordance with the variation degree. For example, scenes are divided when the reproduction media data sets are changed. However, it is possible to provide various scene division method, such as integrating scenes having a low variation degree not suitable for digests.

The invention is not limited to the above embodiments, but various modifications are possible without departing from the scope of the appended claims.

What is claimed is:

1. A data processing apparatus comprising:

input means for inputting a plurality of media data and data describing time relation of reproducing each of the plurality of media data;

inter-media data time analyzing means for analyzing the time relation among the media data;

scene selecting means for selecting a representative scene on the basis of a result obtained by said inter-media data time analyzing means;

media data extracting means for extracting information including the representative scene from each media data; and multimedia data restructuring means for restructuring the extracted information, wherein said scene selecting means includes importance degree calculating means for calculating an importance degree of each scene based on an importance degree of each of the media data, and selecting means for selecting a scene according to the importance degree of each scene calculated by said importance degree calculating means.

2. A data processing apparatus according to claim 1, further comprising intra-media data time analyzing means for analyzing a content of the media data in accordance with a type of the media data.

3. A data processing apparatus according to claim 2, wherein said intra-media data time analyzing means includes means for detecting a change point of video image or sound data.

4. A data processing apparatus according to claim 1, wherein said multimedia data restructuring means outputs data of an HTML format.

5. A data processing apparatus according to claim 1, wherein said input means inputs data of an SMIL format.

6. An apparatus according to claim 1, wherein the importance degree of each of the media data is made equable.

7. A data processing method comprising:

an input step, of inputting a plurality of media data and data describing time relation of reproducing each of the plurality of media data;

an inter-media data time analyzing step, of analyzing the time relation among the media data;

a scene selecting step, of selecting a representative scene on the basis of a result obtained in said inter-media data time analyzing step;

a media data extracting step, of extracting information including the representative scene from each media data; and a multimedia data restructuring step, of restructuring the extracted information, wherein said scene selecting step includes an importance degree calculating step, of calculating an importance degree of each scene based on an importance degree of each of the media data, and a selecting step, of selecting a scene according to the importance degree of each scene calculated in said importance degree calculating step.

8. A data processing method according to claim 7, further comprising an intra-media data time analyzing step, of analyzing a content of the media data in accordance with a type of the media data.

9. A data processing method according to claim 8, wherein said intra-media data time analyzing step includes a step of detecting a change point of video image or sound data.

10. A data processing method according to claim 7, wherein said multimedia data restructuring step includes outputting data of an HTML format.

11. A data processing method according to claim 7, wherein said inputting step includes inputting data of an SMIL format.

12. A storage medium storing a program realizing the method according to claim 7 in a format executable by a computer.

13. A method according to claim 7, wherein the importance degree of each of the media data is made equable.

14. A data processing apparatus comprising:

input means for inputting a plurality of media data and reproduction control information describing time relation among of reproducing each of the plurality of media data;

preparing means for preparing scene reproduction control information for reproducing a scene selected from information relating to the plurality of media data, differently from the reproduction control information input to said input means; and digest data preparing means for preparing digest data of a plurality of scenes from the plurality of media data input by said input means, wherein said digest data preparing means includes:

inter-media data time analyzing means for analyzing time relation among the media data; and scene dividing means for dividing a reproduction time based on the reproduction control information into a plurality of scenes on the basis of a result obtained by said inter-media time analyzing means;

calculating means for calculating a variation degree between divided scenes; and selecting means for selecting the scene in accordance with the variation degree for preparing the digest data.

15. A data processing apparatus according to claim 14, further comprising correlating means for correlating the scene reproduction control information with the digest data of the scene.

16. A data processing apparatus according to claim 14, wherein said scene dividing means includes intra-media time analyzing means for analyzing a content of each type of media data.

17. A data processing apparatus according to claim 16, wherein said intra-media time analyzing means includes means for detecting a timing when the type of the media data to be reproduced in each scene changes.

18. A data processing apparatus according to claim 14, further comprising data preparing means generating data representing the digest data of each scene so as to select a scene to be reproduced.

19. A data processing apparatus according to claim 14, wherein the reproduction control information input to said inputting means has an SMIL format.

20. A data processing apparatus according to claim 14, further comprising integrating means for integrating scenes divided in accordance with the variation degree.

21. A data processing apparatus according to claim 14, wherein the scene production control information has an SMIL format.

22. A data processing method comprising:

an inputting step, of inputting a plurality of media data and production control information describing time relation of reproducing each of the plurality of media data;

a preparing step, of preparing scene reproduction control information for reproducing a scene selected from information relating to the plurality of media data, differently from the reproduction control information input in said inputting step; and a digest data preparing step, of preparing digest data of a plurality of scenes from the plurality of media data input in said inputting step, wherein said digest data preparing step includes:
an inter-media data time analyzing step, of analyzing a time relation among media data; and
a scene dividing step, of dividing a reproduction time based on the reproduction control information into a plurality of scenes on the basis of a result obtained in said inter-media time analyzing step;

a calculating step, of calculating a variation degree between divided scenes; and a selecting step, of selecting the scenes in accordance with the variation degree for preparing the digest data.

23. A data processing method according to claim 22, further comprising a correlating step, of correlating the scene reproduction control information with the digest data of the scene.

24. A data processing method according to claim 22, wherein said scene dividing step includes an intra-media time analyzing step, of analyzing a content of each type of media data.

25. A data processing method according to claim 24, wherein said intra-media time analyzing step includes a step detecting a timing when the type of the media data to be reproduced in each scene changes.

26. A data processing method according to claim 22, further comprising a data preparing step, of generating data representing the digest data of each scene so as to select a scene to be reproduced.

27. A data processing method according to claim 22, wherein the reproduction control information input in said inputting step has an SMIL format.

28. A data processing method according to claim 22, further comprising an integrating step, of integrating scenes divided in accordance with the variation degree.

29. A storage medium storing a program realizing the method according to claim 22 in a format executable by a computer.

30. A data processing method according to claim 22, wherein the scene production control information has an SMIL format.

31. A data processing apparatus comprising:
input means for inputting a plurality of media data and data describing time relation of reproducing each of the plurality of media data;

inter-media data time analyzing means for analyzing the time relation among the media data;

scene selecting means for selecting a representative scene on the basis of a result obtained by said inter-media data time analyzing means;

media data extracting means for extracting information including the representative scene from each media data; and multimedia data restructuring means for restructuring the extracted information.

32. A data processing apparatus according to claim 31, further comprising intra-media data time analyzing means for analyzing a content of the media data in accordance with a type of the media data.

33. A data processing apparatus according to claim 32, wherein said intra-media data time analyzing means includes means for detecting a change point of video image or sound data.

34. A data processing apparatus according to claim 31, wherein said input means inputs data of an SMIL format.

35. A data processing method comprising:
an input step, of inputting a plurality of media data and data describing time relation of reproducing each of the plurality of media data;

an inter-media data time analyzing step, of analyzing the time relation among the media data;

a scene selecting step, of selecting a representative scene on the basis of a result obtained in said inter-media data time analyzing step;

a media data extracting step, of extracting information including the representative scene from each media data; and a multimedia data restructuring step, of restructuring the extracted information.

36. A data processing method according to claim 35, further comprising an intra-media data time analyzing step, of analyzing a content of the media data in accordance with a type of the media data.

37. A data processing method according to claim 36, wherein said intra-media data time analyzing step includes a detecting step, of detecting a change point of video image or sound data.

38. A data processing method according to claim 31, wherein the data input in said inputting step includes data of an SMIL format.

* * * * *

UNITED STATES PATENT AND TRADEMARK OFFICE
CERTIFICATE OF CORRECTION

PATENT NO. : 6,795,092 B1
APPLICATION NO. : 09/503480
DATED : September 21, 2004
INVENTOR(S) : Hiroyuki Nagai et al.

It is certified that error appears in the above-identified patent and that said Letters Patent is hereby corrected as shown below:

Title Page
(56) FOREIGN PATENT DOCUMENTS, "8009310" should read --8-9310--.

Sheet 1
FIG. 1, "DADA" should read --DATA--.

COLUMN 1
Lines 46 and 47, "feels inconvenient" should read --finds it inconvenient--.

COLUMN 5
Line 43, "japanese" should read --a Japanese--.

COLUMN 9
Line 38, "japanese" should read --a Japanese--.

COLUMN 10
Line 9, "$N_{allmedia}$" should read --$N_{all\_media}$--.

COLUMN 11
Line 18, "news caster" should read --newscaster--.

COLUMN 14
Line 18, "among of reproducing" should read --of reproducing--.

Signed and Sealed this

First Day of August, 2006

JON W. DUDAS
*Director of the United States Patent and Trademark Office*